J. MORK
AUTOMOBILE FENDER.
APPLICATION FILED JAN. 13, 1921.
1,372,895.
Patented Mar. 29, 1921.
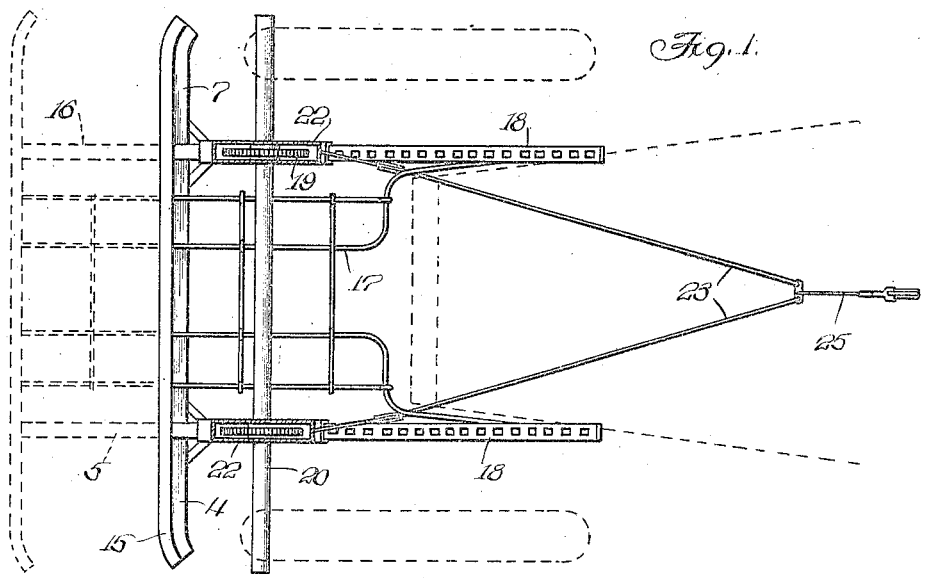
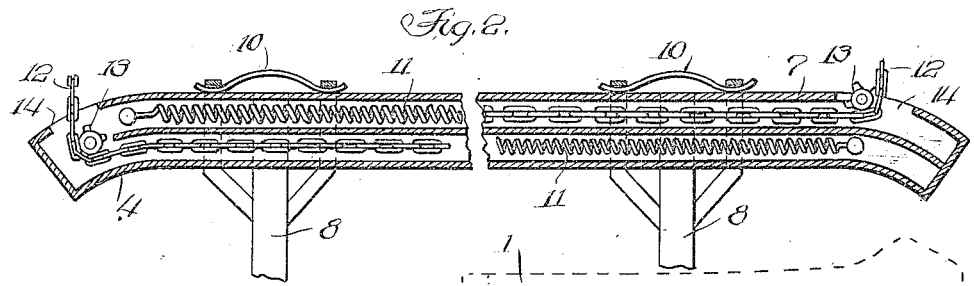
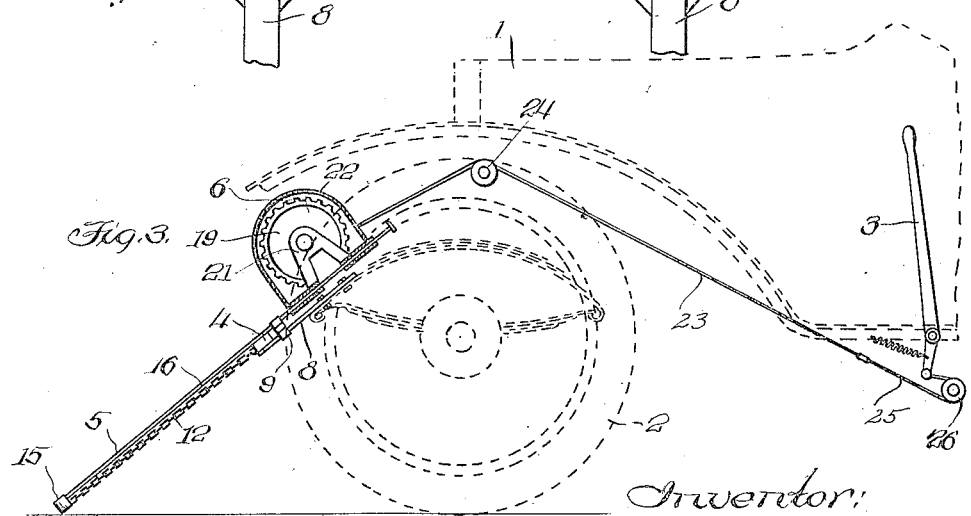

UNITED STATES PATENT OFFICE.

JACK MORK, OF CHICAGO, ILLINOIS.

AUTOMOBILE-FENDER.

1,372,895.   Specification of Letters Patent.   Patented Mar. 29, 1921.

Application filed January 13, 1921. Serial No. 436,868.

*To all whom may concern:*

Be it known that I, JACK MORK, a citizen of the United States of America, and a resident of Chicago, county of Cook, and State of Illinois, have invented certain new and useful Improvements in Automobile-Fenders, of which the following is a specification.

The main objects of this invention are to provide a bumper for motor vehicles having an improved form and arrangement of parts, some of which are movable relatively of certain others which are stationary, whereby the bumper is adapted to be converted into a fender in cases of emergency; to provide means for normally retaining the movable parts of the fender in a retracted position; to provide mechanism adapted to be actuated by the front supporting wheels of the vehicle for shifting said movable parts to an operative position; and to provide means, actuated by the emergency control lever of the vehicle, for moving said mechanism into engagement with said supporting wheels.

An illustrated embodiment of this invention is shown in the accompanying drawings, in which—

Figure 1 is a plan, partly in section, showing the fender in its retracted position, the operative position of the movable parts being shown in dotted outline.

Fig. 2 is a horizontal section of the supporting member, partly broken away.

Fig. 3 is a side elevation of the fender and operating mechanism, partly in section, supported on the front end of a motor vehicle which is shown in dotted outline.

The fender which constitutes this invention comprises, generally, a movable net supporting framework, which is slidably mounted on a stationary supporting member having means for attachment to the front end of a motor vehicle. A bumper bar extends across the front end of the framework and is normally urged toward the support for holding the net in a retracted or inoperative position.

The framework which supports the net is driven to its operative position, forwardly of the stationary member, by a gear and rack mechanism which is actuated by the two front supporting wheels of the vehicle. The driving mechanism, which is normally held in a retracted position, is connected to the emergency brake lever of the vehicle so that the operation of this lever will simultaneously shift the driving mechanism into position to be actuated by the supporting wheels. The release of the emergency brake lever will release the driving mechanism from the vehicle wheels to permit the return of the net framework to its normal or inoperative position.

Referring to the drawings, the fender is shown to be secured to the front end of an automobile 1 having the usual supporting wheels 2 and emergency brake lever 3.

The fender comprises a stationary supporting member 4 having slidably mounted thereon a net supporting framework 5 which is normally held in a retracted position, and a driving mechanism 6 adapted to be actuated by the supporting wheels 2 for shifting the framework to its operative position.

The stationary supporting member comprises a horizontally disposed hollow bar 7 having rigidly secured thereto a pair of brackets 8 which are provided at their inner ends with suitable fastening means for attachment to the vehicle chassis. Rigidly mounted on each of the brackets 8 is a supporting part 9 which has a slot formed near its upper end for slidably supporting the movable framework of the fender. Seated in the slots formed in the forward ends of the brackets 8 are a pair of springs 10 which serve to absorb the shock of the bumper bar when the framework is retracted.

The means for normally retracting the net framework to its inoperative position comprises a pair of helical springs 11 which are located within the hollow bar 7 and which are each secured at one end to respectively opposite ends of the supporting bar. The inner ends of the springs 11 are secured to flexible cables or chains 12 attached to the bumper bar of the framework. These chains pass around pulleys 13 which are mounted at opposite ends of the supporting bar adjacent openings 14.

The framework 5 comprises a bumper bar 15 having a pair of arms 16 extending rearwardly therefrom so as to rest upon and be supported by the bar 7. Secured to the bumper bar 15 and arms 16 is a wire net 17 which forms the basket of the fender. The arms 16 have sliding engagement with the parts 9 and are formed to provide racks 18. The bumper bar 15 is normally urged into contact with the springs 10 for holding the net in a retracted or inoperative position. When the framework occupies its retracted position the fender has the general appearance of the common form of automobile bumper.

The mechanism for shifting the framework to its operative position comprises a pair of gears 19 fixed on a shaft 20 which is journaled in a pair of brackets 21. The gears 19 mesh with the racks 18 and are inclosed in housings 22 carried by the brackets 21. The ends of the shaft extend sufficiently beyond the brackets to permit their engagement by the supporting wheels 2 for actuating the gears when the housings 22 are shifted rearwardly on the arms 16.

Secured to the housings 22 are two flexible cables 23 which pass over pulleys 24 and are secured at their rear ends to a cable 25. The cable 25 passes around a pulley 26 and is secured to the vehicle emergency brake lever so that the operation of the emergency brake will simultaneously shift both of the housings 22 rearwardly to bring the shaft 20 into engagement with the front wheels 2. The engagement of the shaft with the rotating vehicle wheels will actuate the gears 19 to drive the net supporting framework to its operative position. The release of the emergency lever permits the housings to move forwardly and downwardly along the arms 16, thereby causing the springs 11 to retract the framework to its normal position.

Although but one specific embodiment of this invention is herein shown and described, it will be understood that numerous details of construction shown may be altered or omitted without departing from the spirit of this invention as defined by the following claims.

I claim:

1. A fender comprising a supporting member adapted to be rigidly secured to a vehicle, a framework slidably mounted on said supporting member, means for normally holding said framework in a retracted position, a rack formed on said framework, a bracket mounted on said fender so as to be shiftable relatively of said framework, a gear journaled in said bracket and coacting with said rack for shifting said framework into its operative position, a rotatable member connected to said gear, and means for shifting said bracket into position to bring said member into engagement with one of the vehicle supporting wheels for actuating said gear, said member being normally held out of engagement with said wheel.

2. A fender comprising a supporting member adapted to be rigidly secured to a vehicle, a framework slidably mounted on said supporting member, means for normally holding said framework in a retracted position, a rack formed on said framework, a bracket slidably mounted on said rack so as to be shiftable longitudinally thereof, a gear journaled in said bracket and coacting with said rack for shifting said framework into its operative position, a rotatable member connected to said gear, and means for shifting said bracket into position to bring said member into engagement with one of the vehicle supporting wheels for actuating said gear, said member being normally held out of engagement with said wheel.

3. A fender comprising a supporting member adapted to be rigidly secured to a vehicle, a bumper bar having sliding engagement with said support and having a framework connected thereto, means for normally urging said bumper bar toward said support to hold said framework in a retracted position, a rack connected to said bumper bar, a bracket mounted on said fender so as to be shiftable relatively of said rack, a gear journaled on said bracket and coacting with said rack for shifting said framework into its operative position, a rotatable member connected to said gear, and means for shifting said bracket into position to bring said rotatable member into engagement with one of the vehicle supporting wheels for actuating said gear, said member being normally held out of engagement with said wheel.

4. A fender comprising a supporting member adapted to be rigidly secured to a vehicle, a bumper bar having a pair of arms extending outwardly from one side thereof to form a framework for supporting a net, said arms having sliding engagement with said support, means for normally urging said bar toward said support to hold said framework in a retracted position, a rack formed on each of said arms, brackets mounted on said arms so as to be shiftable longitudinally thereof, a shaft journaled in said brackets, a pair of gears fixed on said shaft and coacting with said racks for shifting said bumper bar away from said supporting member to bring said framework into its operative position, and means for simultaneously shifting said brackets into position to bring said shaft into engagement with certain of the vehicle supporting wheels for actuating said gears, said shaft being normally held out of engagement with said wheels.

5. A fender comprising a supporting member adapted to be rigidly secured to a vehicle, a bumper bar having a pair of arms extending outwardly from one side thereof to form a framework for supporting a net, said arms having sliding engagement with said support, means for normally urging said bar toward said support to hold said framework in a retracted position, a rack formed on each of said arms, brackets mounted on said arms so as to be shiftable longitudinally thereof, a shaft journaled in said brackets, a pair of gears fixed on said shaft and coacting with said racks for shifting said bumper bar away from said supporting member to bring said framework into its operative position, and means for connecting said brackets to the vehicle control lever whereby the operation of said lever will simultaneously shift said brackets into position to bring said shaft into engagement with the vehicle supporting wheels for actuating said gears, said shaft being normally held out of engagement with said wheels.

6. A fender comprising a supporting member adapted to be rigidly secured to a vehicle, a bumper bar having a pair of arms extending outwardly from one side thereof to form a framework for supporting a net, said arms having sliding engagement with said support, flexible members connected to said bumper bar, springs connecting said flexible members to said support for normally urging said bar toward said support to hold said framework in a retracted position, a rack formed on each of said arms, brackets mounted on said arms so as to be shiftable along said racks, a shaft journaled in said brackets, a pair of gears fixed on said shaft and coacting with said racks for shifting said bumper bar away from said supporting member to bring said framework into its operative position, and cables for connecting said brackets to the vehicle control lever, whereby the operation of said lever will simultaneously shift said brackets along said racks to bring said shaft into engagement with certain of the vehicle supporting wheels for actuating said gears, said shaft being normally held out of engagement with said wheels.

Signed at Chicago this 11 day of Jan. 1921.

JACK MORK.